US007705058B2

(12) United States Patent
Coutinho et al.

(10) Patent No.: US 7,705,058 B2
(45) Date of Patent: Apr. 27, 2010

(54) METHOD FOR THE MICROWAVE TREATMENT OF WATER-IN-OIL EMULSIONS

(75) Inventors: Raquel Campos Coutinho, Niterói (BR); Montserrat Fortuny Heredia, Aracaju (BR); Márcio Nele De Souza, Rio de Janeiro (BR); Alexandre Ferreira Santos, Aracaju (BR)

(73) Assignee: Petroleo Brasileiro S.A. — Petrobras, Rio de Janeiro (BR)

( * ) Notice: Subject to any disclaimer, the term of this patent is extended or adjusted under 35 U.S.C. 154(b) by 0 days.

(21) Appl. No.: 12/007,082

(22) Filed: Jan. 7, 2008

(65) Prior Publication Data

US 2008/0221226 A1 Sep. 11, 2008

(30) Foreign Application Priority Data

Mar. 7, 2007 (BR) .................................... 0700642

(51) Int. Cl.
*B01D 17/05* (2006.01)
(52) U.S. Cl. ..................................................... 516/194
(58) Field of Classification Search ................ 516/194; 210/787
See application file for complete search history.

(56) References Cited

U.S. PATENT DOCUMENTS

| | | | |
|---|---|---|---|
| 4,582,629 A | 4/1986 | Wolf | |
| 4,810,375 A | 3/1989 | Hudgins et al. | |
| 4,853,119 A | 8/1989 | Wolf et al. | |
| 6,077,400 A | 6/2000 | Kartchner | |
| 6,086,830 A | 7/2000 | Kartchner | |
| 2006/0201855 A1* | 9/2006 | Pinho et al. ................. | 208/263 |

FOREIGN PATENT DOCUMENTS

WO WO 01/12289 2/2001

OTHER PUBLICATIONS

Al-Otaibi et al., "A Computational Intelligence Based Approach for the Analysis and Optimization of a Crude Oil Desalting and Dehydration Process", Energy & Fuels 2005, 19, 2526-2534.*
Chan et al., "Demulsification of W/O Demulsions by Microwave Radiation", Seperation science and Technology, vol. 37, No. 15, pp. 3407-3420, 2002.*
Chan et al; "Demulsification of W/O Emulsions by Microwave Radiation"; Sep. Sci. Technol., 37(15), pp. 3407-3420, 2002.
Xia et al., Stability and Demulsification of Emulsions Stabilized by Asphaltenes or Resins, J. Colloid Interf. Sci., 271, pp. 504-506, 2004.
Kulkarni, et al., "Application of Liquid Emulsion Membrane (LEM) Process for Enrichment of Molybdenum form Aqueous Solutions," Journal of Membrane Science 201, 2002, pp. 123-135.

* cited by examiner

*Primary Examiner*—Ling-Siu Choi
*Assistant Examiner*—Chun-Cheng Wang
(74) *Attorney, Agent, or Firm*—Nixon & Vanderhye P.C.

(57) ABSTRACT

Method for the microwave emulsion treatment of water-in-oil (W/O) emulsions, including a) determining, for an W/O emulsion the optimum conditions of the variables: water content, salt content, pH value of the aqueous phase, initial temperature, microwave application power, final temperature and drop size distribution to be adjusted in the industrial plant, as a function of the features of the tested crude oil such as viscosity, density, asphaltene content, total acidity, such conditions being those required for obtaining at least 90% separation efficiency of the emulsion in the presence of microwave radiation: b) utilizing such information for the initial adjustment of application conditions of the method to phase separation units in refineries and production units; c) perform on line tests of the variables of step a) of the process response in the streams effluent from separation units, being the response the water content and salt content tests, so as to feedback the information to the best adjustment of the process conditions for microwave application; and d) utilizing the on line or laboratory tests of the effect of the method as a tool for monitoring the efficiency of the breaking of the W/O emulsion.

25 Claims, 6 Drawing Sheets

METHOD FOR THE MICROWAVE TREATMENT OF WATER-IN-OIL EMULSIONS

CROSS REFERENCE TO RELATED APPLICATION

This application is based upon, claims the benefit of, priority of, and incorporates by reference, the contents of Brazilian Patent Application No. PI 0700642-0 filed Mar. 7, 2007.

FIELD OF THE INVENTION

The present invention relates to the field of methods for the treatment of water-in-oil emulsions, more specifically, to a method for the treatment of water-in-oil emulsions employing radio frequency or microwaves, as well as to the monitoring of the efficiency of such method of treatment.

BACKGROUND OF THE INVENTION

The complex nature of the emulsions of water in crude oil is one of the main drawbacks to the development of techniques suitable for demulsification and phase separation in the oil industry. In spite of the huge recent efforts for developing dependable and efficient demulsification techniques, most emulsions of water in crude oil cannot be broken in reduced times. Actually the demulsification operation is a key process for removing water from crude oil in production platforms and refineries. Specifically, in order to remove water soluble salts from crude oil up to acceptable levels, there is a need of demulsification (dehydration or desalting) stages in the desalting plants generally encountered in refineries.

Interfacial films on the surface of the dispersed water droplets hinder droplet coalescence, causing stabilization of water emulsions in crude oil.

Surface active species found in crude oil such as asphaltenes, resins, oil-soluble organic acids, solids and paraffin compounds are among the materials constituting said interfacial films. Since some of these compounds contain ionizable groups, it is expected that the pH of the aqueous phase can affect ionization of these groups in the interfacial films, yielding radical changes in the physical properties of films as well as in the solubility of some polar organic compounds relative to the aqueous phase. Thus, a certain number of demulsification techniques for separating water and oil have been applied in the oil industry, including chemical demulsification and pH adjustment. Further, gravity or centrifugation deposition techniques, filtration, thermal treatment, membrane separation and electrostatic demulsification are also applied in the oil industry.

However, the demulsification of water-in-oil emulsions of highly viscous crude oils can be very laborious, leading to excessively time-consuming procedures. Besides, there is the hard job of relating the properties of a crude oil emulsion (which can usually be evaluated in the laboratory, such as water content, salinity, pH, asphaltene content, interfacial film properties and others) and the separation conditions (such as temperature, kind and amount of surface agent, residence time, intensity of electric field, among others), the quantification of it being usually assessed after time-consuming tests and calibrations.

Microwave irradiation is being studied as a tool for demulsification. This is due to the fact that microwave irradiation offers a clean, cheap and convenient heating process that in most of times results into better yields and shorter reaction times. It is considered that reaction acceleration by microwave exposition and also the phenomena involved in demulsification result from wave interactions with the material, leading to thermal effects estimated by temperature measurements (dielectric heating) and specific effects (not purely thermal) generally connected to the selective absorption of microwave energy by polar molecules.

The heating of liquids using microwaves can be explained by the interaction of matter with the electric field of the incident radiation, causing the movement of ions as well as that of induced or permanent molecule dipoles. The movement of such species can cause heat generation. The two main dielectric heating mechanisms are: dipole rotation and ionic conduction, both being reported below in the present specification.

Electric dipoles are formed by the redistribution of electric charges. The action of an electric field causes the orientation of dipole moments parallel to the electric field, while the action of an electromagnetic field results in the rotation of the dipoles caused by the high number of times that the electromagnetic field is alternated.

In liquids, the electric dipoles cannot rotate instantaneously and the time required for the movement of the dipoles depend on the molecular mass, on the viscosity of the medium and on the forces exerted by the neighboring molecules. For low radiation frequencies, the time where the electric field changes direction is higher than the dipole response time. Thus, the electric field is in phase with polarization. The energy supplied by the electric field is employed in the rotation and there is nearly no transformation of electromagnetic energy into heat. For very high radiation frequencies, dipoles cannot follow the electric field changes and the molecules do not move. For frequencies comprised between those two limiting cases, electric dipoles slightly delay with respect to electric field variations and a portion of the energy that the electric field provides for dipole rotation is stored. Such energy will be turned into heat resulting from the friction with neighboring molecules. This heating mechanism is called dipole rotation. When the irradiated sample is an electric conductor or semiconductor formed by ions (such as NaCl aqueous solutions), these ions can move through the material so as to follow the variations in electric field. The resulting electrical currents heat the sample as a consequence of the electrical resistance. This mechanism is called ionic conduction.

During the microwave heating of a material, radiation penetrates the material so that heat transfer occurs from within the material up to the surface of it. This kind of transfer causes the global warming of the material and a quick increase of its temperature.

This kind of heating is quite different from conventional heating which depends on the thermal conductivity of the material, on temperature gradients created throughout the material and on convection currents. Conventional heating is characterized by low rates in temperature increase.

Besides the quick heating of the materials, other advantages can be attributed to dielectric heating relative to conventional heating such as for example:

Selective heating;
Miniaturization of equipment;
Low electrical power consumption cost;
Reduced environmental pollution;

Since the separation of water-in-oil and oil-in-water emulsions employing microwave has been only slightly explored, the literature on this application is scarce.

Broadly, high rates are observed for the separation of water and oil phases, the good results being backed by the mechanisms listed below.

Microwaves quickly heat emulsions, reducing the viscosity of the continuous phase (water-in-oil emulsions), thus favoring the contact among water drops;

The temperature increase can cause reduction in the viscosity of the rigid film formed by natural surface agents in the water-oil interface, making easier the coalescence between said dispersed drops;

The microwave-induced molecular rotation neutralizes the zeta potential of the dispersed drops, thus reducing the stabilization offered by the ionic surface agents;

The preferred absorption of microwaves by water drops in water-in-oil emulsions causes intense internal pressure in these drops, resulting in the expansion of the dispersed phase and in the reduction of the thickness of the interfacial film.

Among these mechanisms, viscosity reduction resulting from temperature rise and reduction of zeta potential when water-in-oil emulsions are exposed to microwaves have been experimentally validated. Those mechanisms based on the increase of pressure within water drops are not proved. On the other hand, the breaking of chemical bonds cannot be induced by the mere adsorption of microwaves in view of the low energy of photons as compared to the chemical bonds-associated energies. The energy range of hydrogen bonds, ionic bonds and Van der Waals-like interactions vary between 0.04 and 4.51 eV, while the microwave photons are associated to energies varying between $1.24 \times 10^{-6}$ and $1.24 \times 10^{-4}$ eV according to the microwave frequency.

The scientific literature as well as patented documents on the separation of water-in-oil emulsions with microwaves will be discussed below in the present specification.

Chang, C. C., Chen, C., Demulsification of W/O emulsions by microwave radiation, *Sep. Sci. Technol.*, 37(15), 3407-3420, 2002 studied the effect of salts and inorganic acids solubilized in the aqueous phase on the efficiency of the separation of water-in-oil emulsions under the action of microwaves. This author has reached the conclusion that the addition of low concentrations of electrolytes and acids raises the demulsification rate of the mixtures. The addition of high electrolyte concentrations can limit the dipole rotation of the water molecules and reduce the efficiency of the phase separation. For the NaCl electrolyte, increased demulsification rates were observed for lower-than 0.5M concentrations. The booster effect on the demulsification for low electrolyte concentrations is related to the increase in the loss factor of these solutions. The influence of the water drops size was also studied by the same author, who found that the demulsification rate rises with the dispersed phase drop size. The experiments were carried out in a conventional microwave oven.

Xia L., Lu, S., and Cao, G., Stability and demulsification of emulsions stabilized by asphaltenes or resins, *J. Colloid Interf Sci.*, 271, 504-506, 2004 have investigated the effect of asphaltene and resin concentration as well as their colloidal state on the demulsification rate of water-in-oil emulsions. In this work it could be observed that for low concentrations of asphaltenes and resins, these species contribute to the stability of the emulsions. On the other hand, the relatively high asphaltene and resin concentrations can favor the building of aggregates that are slightly soluble in the oil phase, those being devoid of stabilizing properties. The demulsification rates of emulsions employing microwaves and conventional heating were also compared. Authors found that the utilization of microwaves increase in one order of magnitude the coalescence rate of the dispersed drops. The experiments were carried out in a conventional microwave oven.

U.S. Pat. No. 4,582,629 describes the first approach directed to the use of microwaves for separating water-in-oil and oil-in-water emulsions. The relevance of this study stems from the fact that a new technique which can replace conventional thermal treaters is advanced. The author also suggests the use of microwaves as a complementary process to thermal heating. Based on the technology exposed in this patent, improvements were developed aiming at increasing the efficiency of emulsion separations. To this end, modifications in the process or in equipment design were proposed.

Accordingly, U.S. Pat. No. 4,810,375 teaches a process for the separation of oil-in-water emulsions using microwaves where the separated water is continuously re-circulated in order to increase the process efficiency. It is further described that the proposed process can be coupled to conventional separation systems, either upstream or downstream the microwave system. This patent refers to the separation of oil-in-water emulsions using the system of the U.S. Pat. No. 4,582,629 with water recirculation.

U.S. Pat. No. 4,853,119 describes the use of a coalescer medium (26) in cavity (14) of U.S. Pat. No. 4,582,629, said coalescer being of any suitable high surface area configuration, such as wood mesh excelsior or corrugated polypropylene. Other high surface area materials may be used, provided they have a low dielectric constant and a low loss factor. Preferred materials are those having a dielectric constant at 2450 MHz of from about 0.1 to about 15, most preferably from 2 to 3, and a loss factor of from near zero to about 2, most preferably less than 0.05.

U.S. Pat. Nos. 6,077,400 and 6,086,830 describe a unit formed by two juxtaposed cavities constructed from conductive materials separated by a central waveguide. It is alleged that in such cavities the microwaves are quickly reflected and resonance patterns lead to high microwave absorption rates. The upward flow of emulsion throughout both cavities aims at delaying the deposition of solids such as sands. The entry of the emulsion in this unit is preceded by a heating step using conventional techniques which take the fluid temperature to the 49° C. to 52° C. ranges. It is considered that this heating step makes possible, on the one hand, the melting of some solids such as waxes and dirt so as to increase the emulsion dielectric constant, and on the other hand, the viscosity reduction of the emulsions, which makes their flow easier. In this unit, the temperature in the cavities has been kept constant with the aid of modifications in the inlet flow rate of the emulsion in the cavities. This patent document describes a two-step process for emulsion separation comprising exposing the emulsion to microwaves using the unit of U.S. Pat. No. 4,582,629 followed by complete phase separation by centrifugation or gravity separation in a separator.

In the international publication WO 01/12289 is described a microwave process for water-in-oil emulsion separation based on the choice of optimum radiation frequencies for which the power consumed in the process is minimized. In this process the dwell time of samples exposed to radiation is lower than 5 seconds, during which the emulsion temperature increases 10° C. Optimum frequency should be chosen as a function of the experimental conditions such as temperature, salt concentration, water drop size and water percentage in the emulsion. Applicants state that such frequency should secure the selective water heating, avoiding microwave-oil interaction while at the same time maximizing the dielectric loss factor. This factor is related to the efficiency of the matter (in this case water) to convert electromagnetic energy into heat. The loss factor has maximum values depending on the kind of fluid to be heated. Thus for oils the maximum values found for the loss factor is at frequencies lower than 1 GHz, for water such frequencies are found near to 20 GHz and for brine frequencies lower than 3 GHz result into optimum loss factors. On the other hand, the optimum radiation frequency is influenced by the water drop size. The drop diameter should be quite lower than the radiation penetration depth. It should be borne in mind that the penetration depth is reduced with the frequency increase, thus, for 20 GHz frequencies penetration depths of 3 mm can be identified. Applicants point out the relevance of including an agitation system to favor the contact among water drops. Additional information related to the process such as the kind of oil or the temperature and working power are not included in the published document. There is also no mention as to on-line monitoring or to adjustment of operation conditions resulting from the obtained results.

In spite of existing processes, the current available technology does not contemplate the assessment and use of the information on the variables: total water content and salt content of the emulsion, aqueous phase pH, temperature, agitation, besides information related to the oil phase features such as viscosity, density, total acidity number (measured as TAN), asphaltene content, resin content, amount and kind of solids, and so on, in a method for treating water-in-oil emulsions and monitoring said treatment. Such variables determine the efficiency of the breaking of a water/highly viscous oil in the presence of microwave energy applied in a microwave apparatus in a method for treating water-in-oil emulsions and monitoring said treatment, said method being described and claimed in the present application.

BRIEF SUMMARY OF THE INVENTION

Broadly, the present invention relates to a method for the treatment of water-in-oil emulsions in the presence of microwaves.

The method for the treatment of water/highly viscous oil emulsions according to the invention comprises the steps of:

a) determining in the laboratory for a water-in-oil emulsion prepared from the crude oil under test and aqueous streams, the optimum conditions of the variables: water content, salt content, aqueous phase pH, initial temperature, microwave radiation power, final temperature and drop size distribution to be adjusted in the industrial plant, such conditions being those required for obtaining at least 90% efficiency in the separation of said emulsion in the presence of microwave radiation as a function of the features of the crude oil under test, such as viscosity, density, asphaltene content, total acid number (measured as TAN), etc.;

b) employing such information for the initial adjustment of the conditions for applying the inventive method in phase separation units in refineries and in production units;

c) on-line testing: i) step a) variables; ii) the process response in the effluent streams from the separation units, such response being the water and salt content measurements, so as to feedback the obtained information to the best adjustment of the process conditions for the microwave application;

d) alternatively, carrying out laboratory tests for step c) variables, which cannot be tested on-line, so as to make available the information required for the application of the inventive method;

e) additionally, using the on-line or laboratory measurements related to the effect of the method as a tool for monitoring the process efficiency;

f) alternatively, complementing the crude oil characterization with the aid of resin content, naphthenic acid, interfacial viscosity, interfacial tension, amount and kind of solids tests.

Thus, the invention provides a method for the treatment of water-in-oil emulsions in the presence of microwave energy allowing high separation efficiency of the aqueous phase with residence times and optimized process conditions, such as low energy consumption relative to state-of-the-art processes.

The invention also provides the monitoring of the efficiency of the method of treatment of water-in-oil emulsions in the presence of microwave energy.

DETAILED DESCRIPTION OF THE INVENTION

Figure 6:
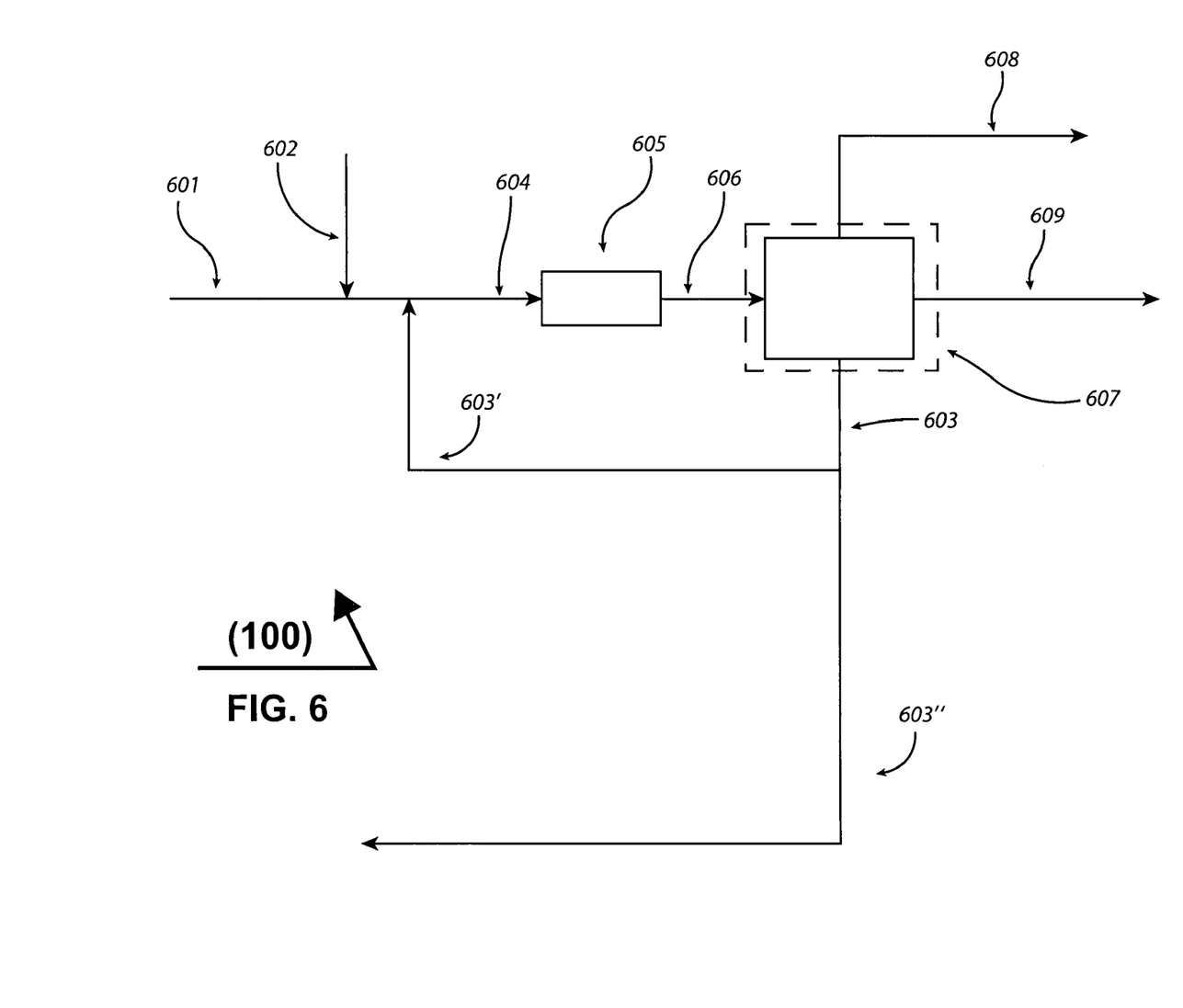
FIG. 6 attached is a schematic flowsheet of a first mode of the invention illustrating the microwave desalter of the invention for the treatment of the water-in-oil emulsion and phase separation.
Figure 7:
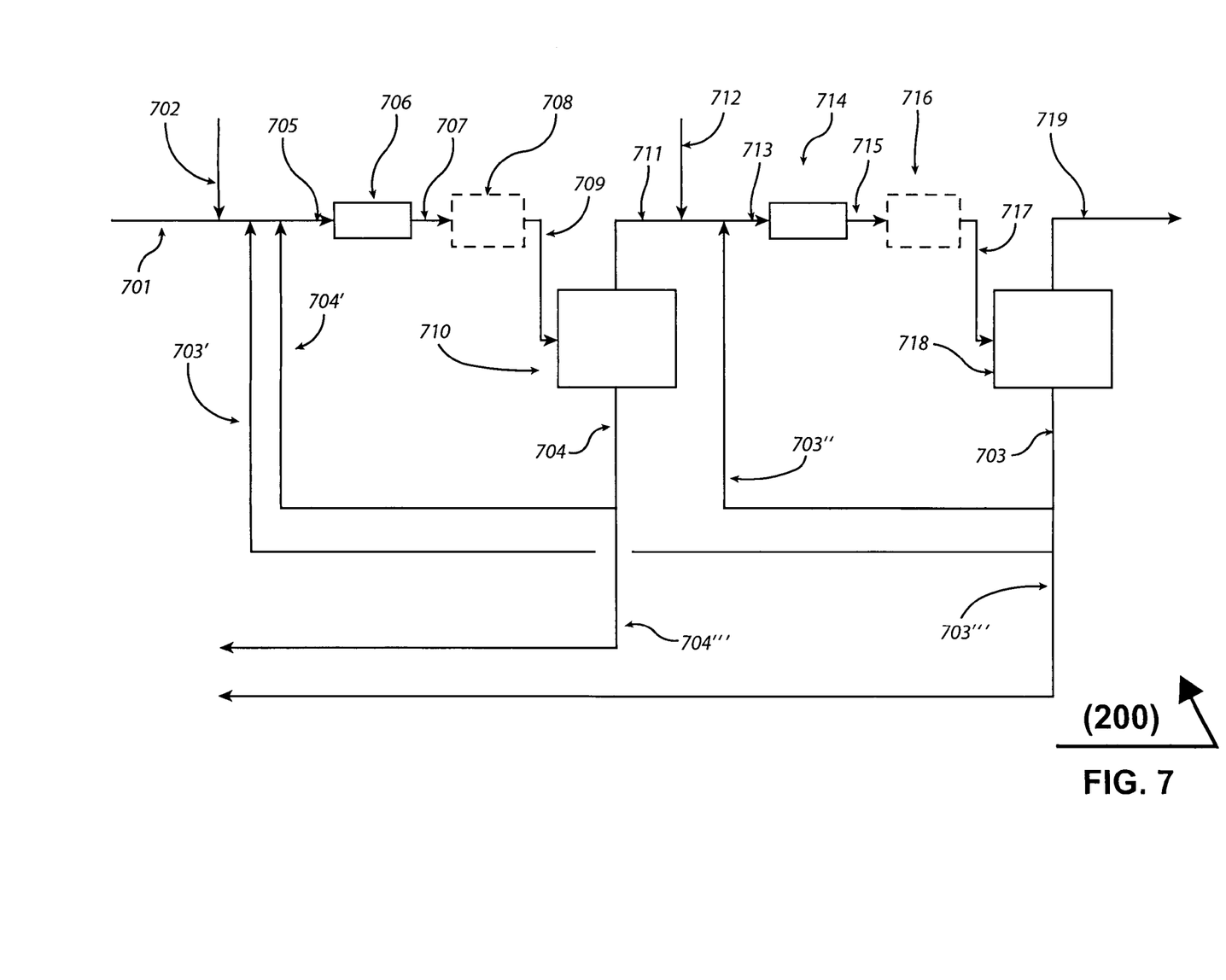
FIG. 7 attached is a schematic flowsheet of a second mode of the invention illustrating the microwave desalter of the invention, coupled to a downstream device (710 and 718) aiming at complementing phase separation.
Figure 8:
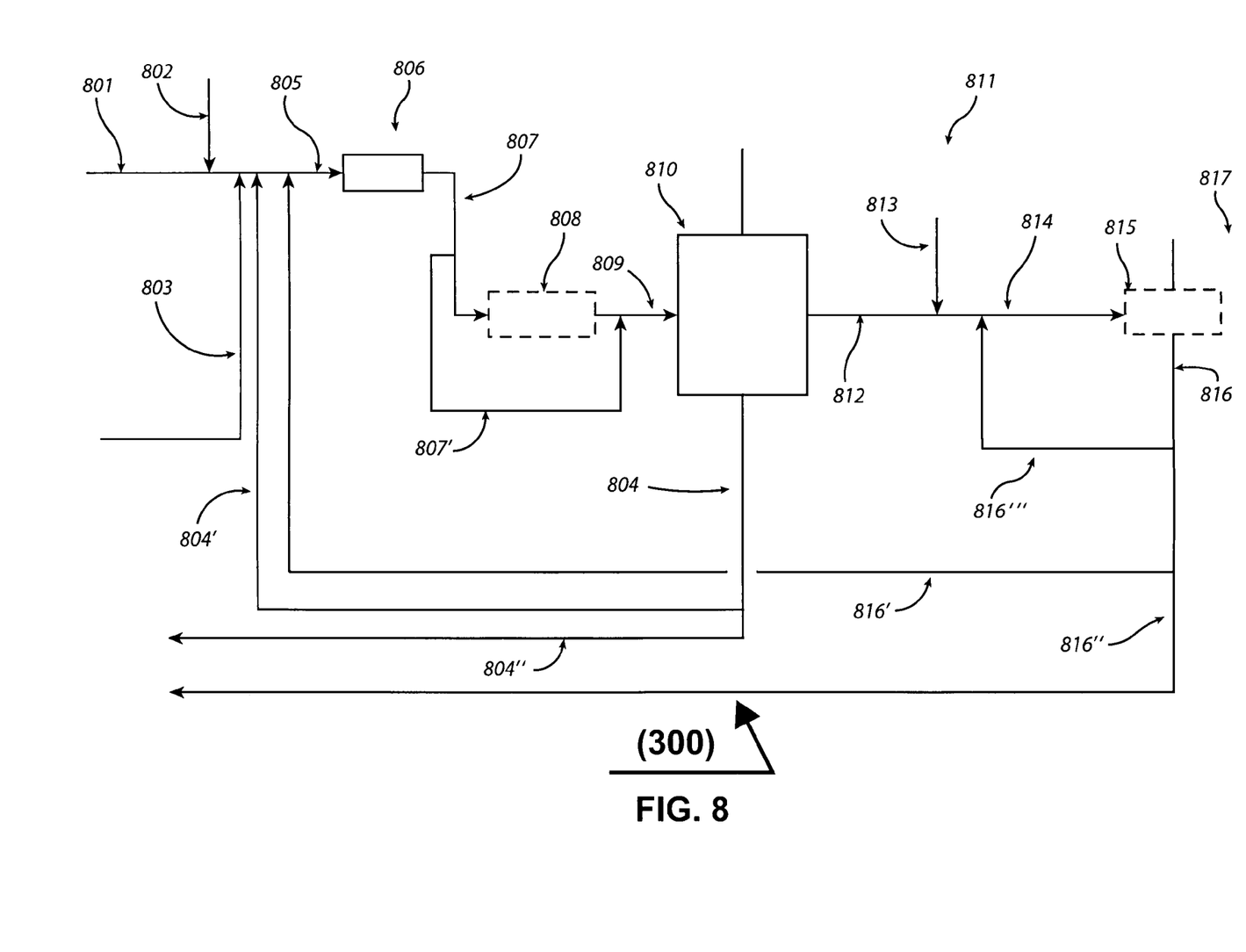
FIG. 8 attached is a schematic flowsheet of a third mode of the invention including a microwave desalter coupled to a device (810) for downstream separation aiming at complementing phase separation besides a microwave desalter (815) to be applied to the residual emulsion phase only after a first water-in-oil separation step.

According to the invention, the expression "reduced content in water soluble salts and solids" of aqueous streams (602), (702) and (802) to be added to the oleaginous streams (601), (701) and (801) means that these streams contain salt and solids contents lower than those present in the feed, those salt content being for refineries usually lower than 200 mg/L and solids content lower than 100 ppm mass/mass while in production units the salt content is usually lower than 30,000 mg/L and the solids content, lower than 100 ppm mass/mass.

The invention contemplates a method for the treatment of water/highly viscous oil emulsions with the aid of microwaves, where the process conditions are determined on the basis of the effect of a set of variables of the water/crude oil emulsion on the demulsification process using microwaves, and where such conditions include the aqueous phase pH value, salt and water contents of the water-in-oil emulsion/dispersion, the viscosity of the crude oil and the initial temperature of the emulsion to be treated.

The invention is applicable to any kind of water-in-oil emulsion, and it is applicable to crude oil emulsions comprising components that may include solids, asphaltenes, organic acids, basic nitrogen compounds and mixtures of same. Thus, the invention can be applied to water-in-oil emulsions/dispersions of crude oils, vegetable oils, animal oils, synthetic oils and mixtures of same.

Crude oils include any oils comprising organic acids, and can equally contain asphaltenes, solids, basic nitrogen compounds and emulsifiers which are naturally present in the emulsion. Thus, the oils forming the emulsion can include crude oils, crude oil distillates, crude oil residues, or oils derived from vegetable or animal sources such as vegetable and animal oils or synthetic oils like silicone oils or mixtures of same in any amount.

The emulsion can equally include emulsifiers present in the oil, but those will not be purposely added to the system.

On the other hand, demulsifying chemicals can be present or be intentionally added aiming at the demulsification.

Commercial demulsifiers are typically admixtures of several compounds of different features and chemical structures. Esters, di-epoxides, sulfonates, polyester amines, alkoxylated phenols, oxyalkylated polyamides, alkanolamines, ethylene oxide and propylene oxide copolymers are frequently present in these formulations. Each of these components has a specific action, conveying several properties to commercial demulsifiers. Ability for destabilizing the interfacial film, action as wetting agent for solid particles, flocculation promotion and change in the rheological properties of the interfacial films are attributes of those products.

The feed to be treated according to the present process can contain solids which are naturally encountered in this kind of feed and processes. Typical solids include mud, sediments, sand, silica, coke or corrosion residues. However, the addition of such solids will not be intentional, since solid-stabilized emulsions are harder to demulsify.

The treating method of emulsions or dispersions of water in petroleum or its fractions according to the invention is suitable to be applied in production facilities. In this case the oil already contains water, that is, production water and/or connate water.

The present invention is also applicable to refineries. In a refinery, water-in-oil emulsions or dispersions can be formed during the processing of oils or either can be present when crude oils are directed to the refinery for processing. Petroleum is sent to the refinery having approximately 1 wt % of emulsified or dispersed water. Such water contains a certain amount of salts which should be withdrawn through a desalting process. Upstream the desalting unit, a further amount of water of reduced salt content is added to the emulsion/dispersion so as to dilute the salt concentration in the aqueous phase and the resulting emulsion/dispersion is submitted to a phase separation process. Refinery desalting units are particularly adequate for the separation of the emulsion phases once the microwave treatment is completed in order to coalesce dispersed water droplets and recover oil.

Techniques for separation oil and water, combined to the microwave treatment include centrifugation, gravity separation, ultra sound, hydrocyclones, electrostatic separation, filtration, membrane separation or a combination of these techniques.

Microwaves used before conventional separation processes can equally serve to separate the emulsion/dispersion, or either can be used in combination with other phase separation techniques. These techniques are easily applicable by the experts under the conditions required for separating the emulsion into an oleaginous phase and an aqueous phase. For example, centrifugation can be conducted at 500 and up to 150,000 g during around 0.1 minute and up to 6 hours or more and electrostatic field of ca. 500-5,000 volts/inch applied during around 0.1 minute up to around 24 hours or more.

In case has water and salt contents of the feed are of high variability, in order to fully characterize the system the method of the invention is initially applied in the laboratory.

According to the inventive method, a series of demulsification runs are carried out in the batch mode in order to evaluate the final residual water content of emulsion samples after exposition to microwaves. Tests are run at distinct heating temperatures using water-in-heavy crude oil emulsion samples containing different contents of salt, water and pH value. Precise heating and final temperature programs are set so as to monitor the amount of energy applied to the emulsion and consequently the viscosity of the oleaginous phase. The viscosity reduction caused by the temperature effect for each of the oils is determined by rheological tests of this fluid at the chosen temperatures. For the studied oils it could be observed that the influence of temperature on the viscosity can be described with the aid of decreasing exponential functions.

Such information is used for the initial adjustment of the conditions for applying the present method to phase separation units in refineries and production units.

Still, it is possible to run on-line or laboratory measurements for relevant variables such as water content, salt content, pH value of aqueous streams, viscosity, drop size distribution among others, besides temperatures and flow rates so as to feedback the data to the better adjustment of the microwave application.

On-line or laboratory measurements on the effect of the method are also carried out and used as monitoring and feedback to the control of the microwave application, aiming at phase separation efficiencies of at least 90%.

The invention will now be illustrated by a specific, non-limiting Example.

EXAMPLE

Preparation of the Emulsion

Water-in-oil emulsions are prepared through homogenization of known amounts of 19.1° API heavy crude oil as well as model brine solutions containing specified amounts of NaCl and NaOH in order to adjust the salt contents and pH values of the emulsions aqueous phase. The alkaline solution consists of aqueous 0.07 wt % NaOH.

The features of this oil are summarized in Table 1 below.

TABLE 1

| Crude oil Properties | |
|---|---|
| Density, °API | 19.1 |
| WC, wt % (a) | 0.76 |
| Asphaltene content, wt % (b) | 2.95 |
| Viscosity at 30° C., cP | 290 |
| TAN, mg KOH/g crude oil (c) | 1.32 |
| Salinity, mg NaCl/L crude oil | 279 |

(a) WC means water content (% w/w) in the admixture.
(b) Defined as the oil fraction containing n-heptane insolubles
(c) TAN means total acid number The emulsion synthesis procedure can involve several stages, such as for example pre-emulsification and emulsification stages. During pre-emulsification, a known amount of aqueous solution is added by increments to the oleaginous phase while the admixture is manually agitated to fully incorporate the aqueous phase, resulting in a pre-emulsion.

In the second stage such mixture is homogenized with the aid of homogenizers which mix and disperse through whirling added aqueous solutions as well as those already present in the oil sample.

The aqueous phase and crude oil ratio in the admixture can be varied in order to prepare an emulsion having the desired WC value. Homogenization conditions such as agitation rate and homogenization time should be such as to yield emulsions having suitable drop size distributions (DSD).

Emulsion Characterization

Properties of the emulsion such as DSD and water content are assessed before and after each test. The water content of the emulsions is assessed via potentiometric titration with the aid of Karl Fischer (KF) reagent according to ASTM Method ASTM D-1744.

The DSD of emulsion samples is obtained with the aid of a Malvern Instrument Model 2000 Mastersizer particle size analyzer instrument making use of the laser beam diffraction technique.

For all the synthesized samples, DSD data report bimodal distributions and average drop size in the range of 3 to 60 μm. Such range is similar to that encountered in emulsion generation tests under field conditions in Applicant facilities where emulsions occur in flow lines during oil production aided by water injection, resulting in fine droplets emulsions caused by the presence of a choke valve and a centrifugal pump.

Demulsification tests using microwave irradiation are described below in the present specification.

Demulsification tests using microwave radiation are conducted using a commercial microwave reactor system (Anton Paar Synthos 3000) provided with two magnetrons supplying 1,400 W continuous microwave power and a rotor system in which eight 80 mL-capacity flasks can be inserted at a time. Besides, each flask is provided with a magnetic stirrer. The standard demulsification test involves two 40 g emulsion flasks, submitted to 15 minutes irradiation for each test. A program increases the temperature up to a set temperature in two minutes then it is kept as such during the following 13 minutes.

After the irradiation period, the samples are cooled during 10 minutes with the aid of an air blower coupled to the microwave unit and the different phases formed during the demulsification test are characterized in terms of masses as well as of the remaining emulsion resolved water. Karl Fischer tests are carried out in order to evaluate the non-resolved water content in the remaining emulsion ("final WC" values). The final WC values can then be compared to the WC values of the original emulsion sample ("initial WC" values) in order to determine the efficiency of the demulsification process using microwave irradiation.

Such efficiency (EF) is calculated for each test according to the following equation (1).

$$EF = 1 - (\text{final } WC/\text{initial } WC) \quad (1)$$

An experimental study was conducted in order to evaluate the effects of a set of operation variables on the demulsification performance.

Several runs with microwave irradiation are carried out for different heating temperatures (80° C., 95° C. and 130° C.), using water-in-oil emulsion samples containing different water contents (25%, 35% and 45%), salt contents (0.0, 15,000 and 30,000 ppm) and pH values (7.0, 9.5 and 12.0).

It should be noticed that salt contents of 30,000 or more are more easily encountered in the water present in the geologic formation and are produced together with crude oil during oil production in the field. On the other hand, the salt content of the aqueous phase can vary during the desalting process in the refinery, caused by the dilution which is inherent to the refining scheme. Thus, the study of the salt content effect on the microwave demulsification can be useful to break the emulsions generated during petroleum production and also during the refinery desalting process.

Chosen pH values of the aqueous phase are in the alkaline range since most of the observed emulsions in the field contain additives which generally lead to a pH increase.

Temperature variations aim at causing variations in the viscosity of the emulsion continuous phase as well as in the interfacial film features.

Table 2 below summarizes, for the microwave demulsification tests, the set of emulsion and aqueous phase properties, operation temperature conditions, the applied energy and the final WC of the resulting emulsion.

TABLE 2

| Test | Emulsion Initial Properties[a] | | | | Aqueous phase Properties | | Operation Conditions | | Demulsification Performance |
|---|---|---|---|---|---|---|---|---|---|
| | WC % | D(0.5), μm | D(0.9), μm | D(4.3), μm | Salinity mg NaCl/L water | pH | Temp, °C. | Energy kJ | final WC % |
| T1 | 25 | 6.1 | 15.3 | 7.2 | 0 | 7.0 | 80 | 303 | 24.9 |
| T2 | 35 | 8.5 | 22.7 | 10.3 | 0 | 7.0 | 80 | 174 | 27.4 |
| T3 | 45 | 3.5 | 16.7 | 7.3 | 0 | 7.0 | 80 | 143 | 17.0 |
| T4 | 45 | 19.6 | 53.0 | 23.5 | 30,000 | 7.0 | 80 | 50 | 24.7 |
| T5 | 45 | 22.5 | 62.4 | 26.9 | 15,000 | 7.0 | 80 | 61 | 23.6 |
| T6 | 45 | 5.6 | 26.5 | 10.3 | 0 | 9.5 | 80 | 122 | 20.2 |
| T7 | 45 | 22.1 | 59.5 | 28.0 | 0 | 12.0 | 80 | 100 | 12.5 |
| T8 | 45 | 15.3 | 42.1 | 23.4 | 30,000 | 9.5 | 80 | 47 | 28.5 |
| T9 | 45 | 16.1 | 53.3 | 22.6 | 30,000 | 12.0 | 80 | 45 | 45.0 |
| T10 | 45 | 20.6 | 64.0 | 26.9 | 0 | 7.0 | 95 | 156 | 8.2 |
| T11 | 45 | 16.9 | 59.5 | 24.3 | 0 | 7.0 | 130 | 255 | 2.6 |

[a]D(0.5) means the DSD median, D(0.9) means the diameter below which 90% of the water drops are represented and D(4.3) means the DSD volumetric average diameter Influence of WC on the demulsification performance Since the dielectric properties are influenced by the composition of the medium, it is mandatory to determine the relationships between these properties and the emulsion WC. This is especially relevant in demulsification processes, where WC variations are likely to occur.

Figure 1:
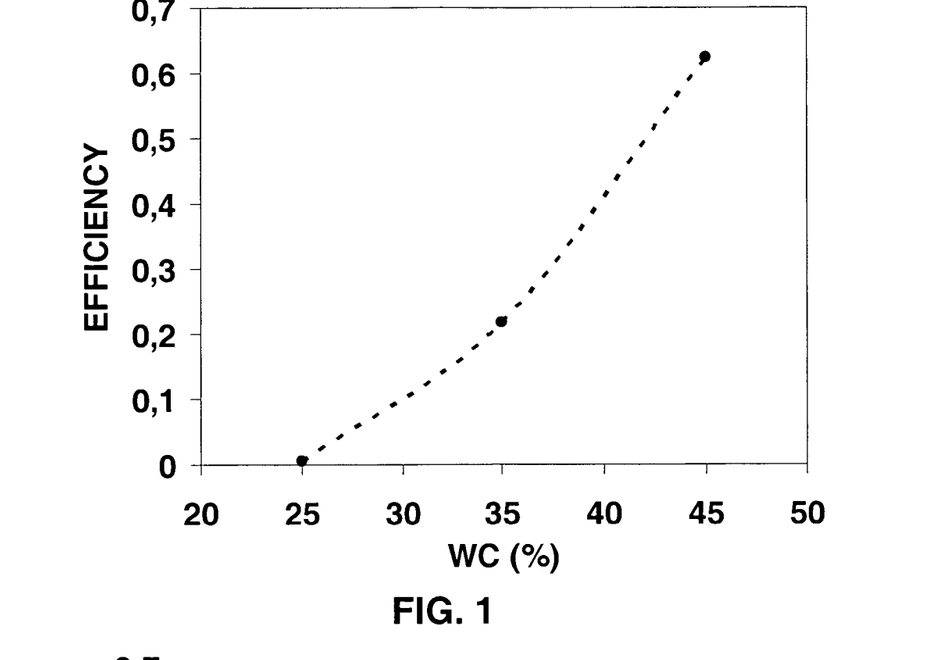
FIG. 1 attached is a graph of water content (WC) vs Emulsification efficiency illustrating the variation of the efficiency of the microwave separation as a function of the water content WC for tests T1, T2 and T3.

T1, T2 and T3 tests are conducted under analogous experimental conditions having different emulsion WC values. According to Table 2 above and FIG. 1, improved emulsion resolution is obtained for emulsions having higher initial WC.

The effect of the emulsion composition on the dielectric heating is given by the following equation (2):

$$p = 2 \times \pi \times f \times \in_0 \times \in'' \times E^2 = \sigma \times E^2 \qquad (2)$$

where the dissipated power per unit volume (p) is related to the permissivity in vacuum ($\in_0$), the loss factor ($\in''$), the electrical field intensity (E) and its frequency (f).

This relationship shows that the energy dissipation is proportional to the electrical conductivity ($\square$). Therefore, the higher the water content in the emulsion, the larger will be the energy dissipation per unit volume of the sample and therefore the heating effect. In this sense, the energy required for increasing the emulsion temperature up to 80° C. was 303 kJ for T1 test (where the emulsion initial WC is 25%) and 143 kJ for T3 test where the emulsion initial WC is 45%.

Influence of Salinity on Demulsification Efficiency

It is recommended to determine the influence of the salt content on the demulsification efficiency since the dielectric heating is influenced by the salt content in the aqueous phase and the existence of ionic species in the medium increases the heating efficiency of the mixture.

Figure 2:
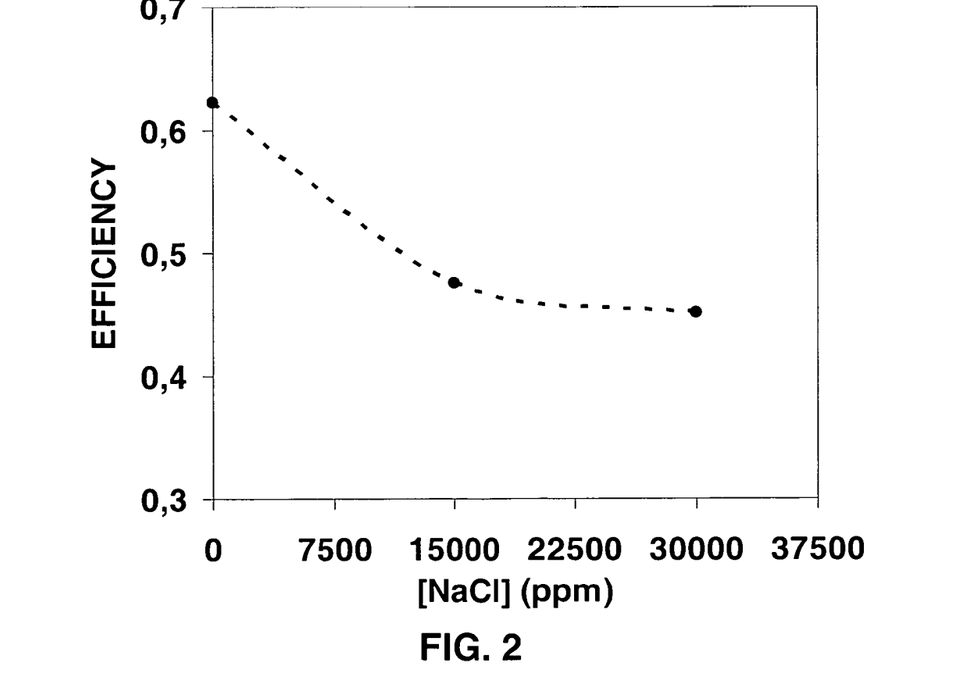
FIG. 2 attached is a graph that illustrates the variation of the efficiency of the microwave separation as a function of the salt content for tests T3, T4 and T5.

A set of experiments is conducted using brine solutions the concentration of which is 15,000 and 30,000 ppm NaCl. Tests T3, T4 and T5 are carried out using emulsions containing 45% initial WC and different salt contents in the aqueous phase. As related in Table 2 and FIG. 2, the increase in salt content reduces the amount of microwave energy required for increasing the temperature until the set value, resulting in more efficient heating.

It is important to stress that higher salinity contributes to emulsion stability. This effect, combined to the lower applied energy result in reduced microwave demulsification efficiency with the increase in the aqueous phase salinity. Thus, according to the invention the microwave desalter will be more efficient when the emulsion fed to it has a minimum salt concentration, which is an easily attainable condition via dilution-operation. In this case the water addition doubly favors the microwave demulsification process, through salinity reduction via dilution as well as by increase in water content.

Influence of pH on Demulsification Efficiency

Demulsification tests T3, T6, T7 are carried out for different salt contents as well as pH values.

Since emulsion pH increase occurs via NaOH solutions addition to the system, and electrolyte addition to the aqueous phase favors dielectric heating, experiments involving emulsions of higher pH values (9.5 and 12.0) require lower energy levels in order to attain the same set temperature level, as shown in Table 2 above.

Figure 3:
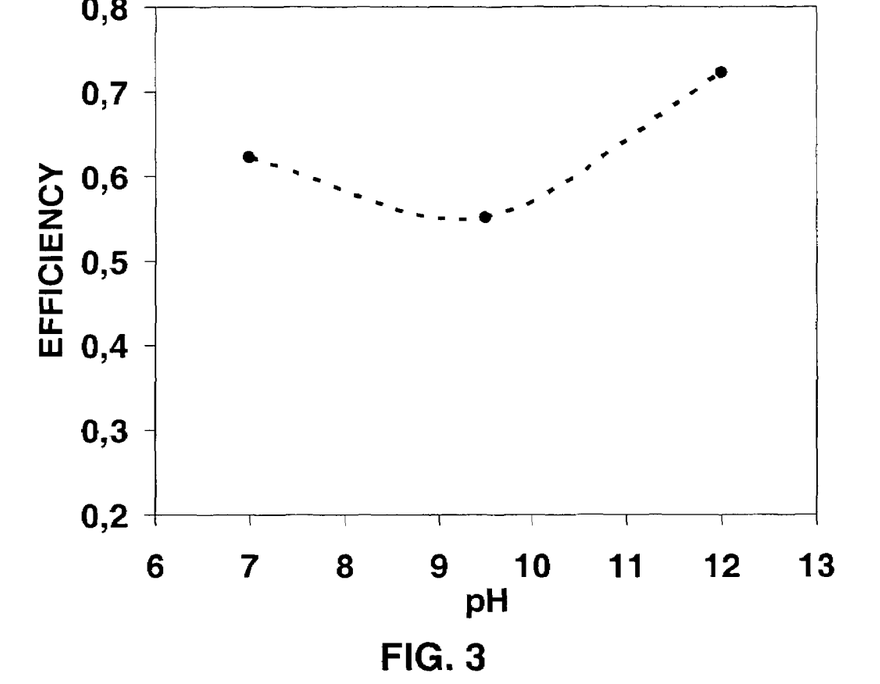
FIG. 3 attached is a graph that illustrates the variation of the efficiency of the microwave separation as a function of the pH for salt-free emulsions, tests T3, T6 and T7.

Besides, as shown in FIG. 3, experiments carried out at pH 9.5 lead to final WC values comparable to those obtained for experiments at pH 7.0.

Experiments carried out at pH 12.0 yield final WC data quite different from those obtained at lower pH values, as shown in Table 2 and FIG. 3. When one considers salt-free emulsions at pH 12.0 such as those of test T7, the total energy applied during the demulsification process is lower than in the experiments using emulsions at pH 7.0 or 9.5. In spite of the lower energy supply, pH 12.0 tests provide a highly efficient demulsification, which can be explained by the reduced stability of water-in-oil emulsions with increased pH, the microwave effects being apparently independent from that. In effect, it should be pointed out that the resolved water obtained from tests at pH 12.0 is rather different from those obtained from tests carried out under different conditions, which seem dirty and opaque, suggesting that a kind of phase micellization has a role, and then portions of the oil remain dissolved in the aqueous phase.

Figure 4:
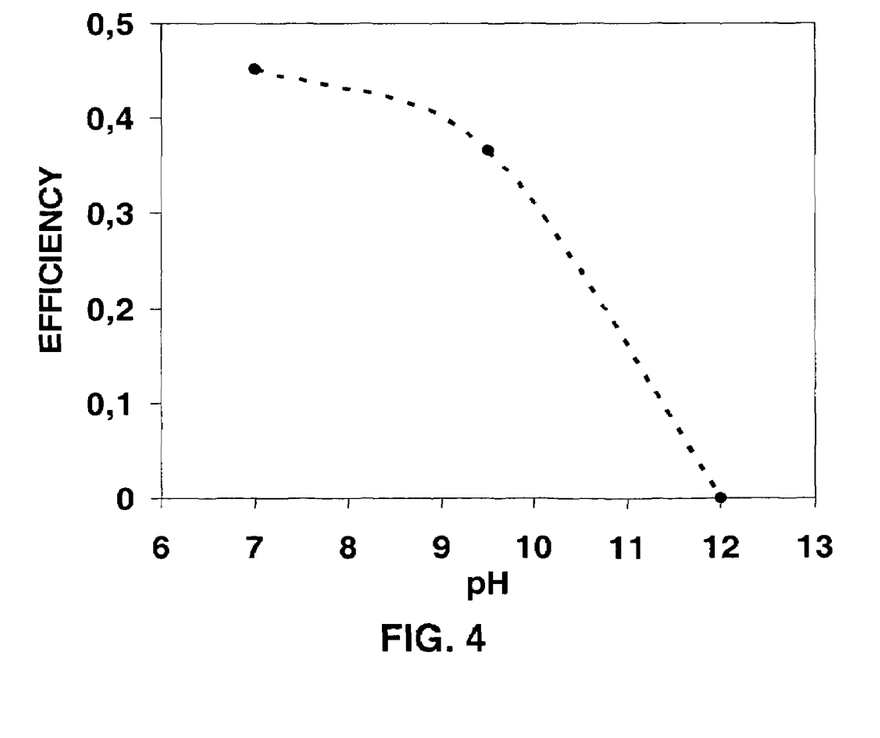
FIG. 4 attached is a graph that illustrates the variation of the efficiency of the microwave separation as a function of the pH for emulsions containing 30,000 ppm NaCl, tests T3, T8 and T9.

Inversely, free water is not observed after demulsification tests carried out on pH 12.0 emulsions, containing 30,000 ppm NaCl (test T9, Table 2). DSD data for these tests show that the DSD curves before and after each demulsification run are kept essentially constant. Besides, as observed from FIG. 4, the influence of pH on the demulsification efficiency varies with the presence or absence of salt in the aqueous phase.

According to the invention, it is considered that the ideal pH range is between 7.0 and 9.5 in which high efficiencies can be obtained with or without salt. It should be obvious for the experts that this optimum range can change for different oils.

Influence of Temperature on Demulsification Performance

Figure 5:
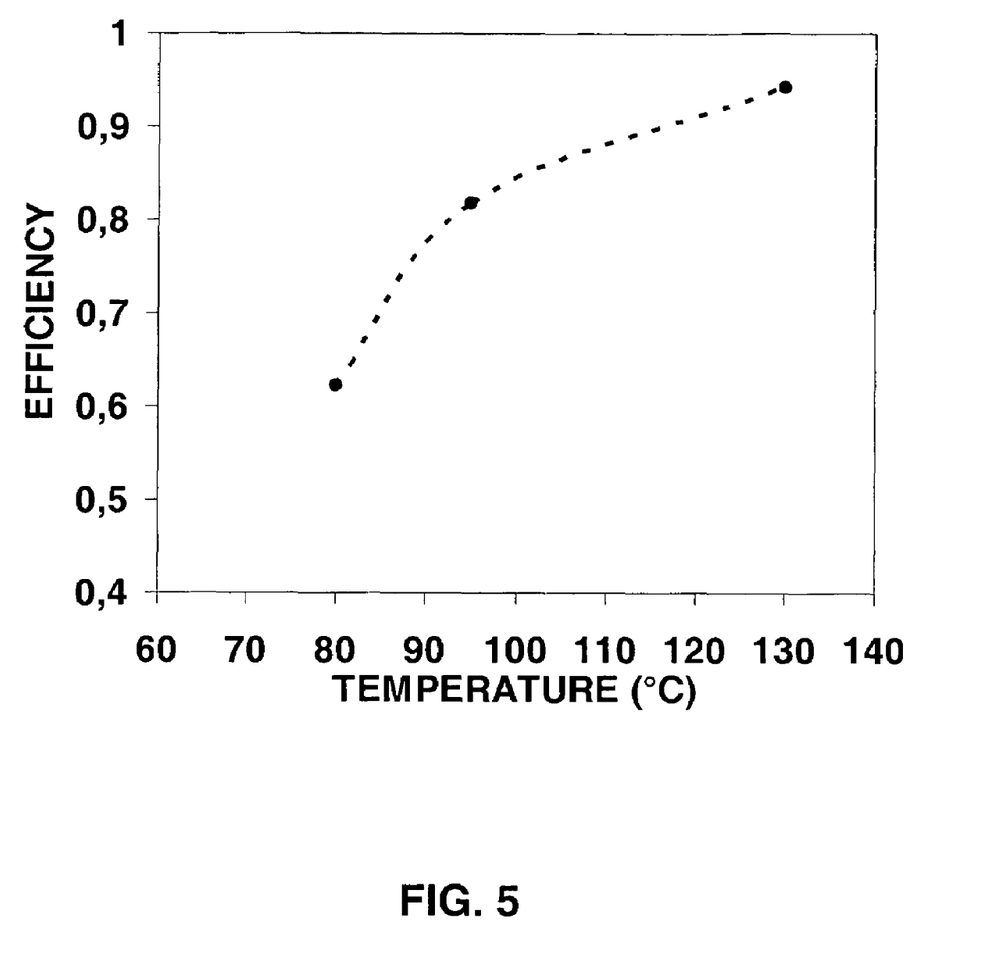
FIG. 5 attached is a graph that illustrates the variation of the efficiency of the microwave separation as a function of the heating temperature, tests T3, T10 and T11.

In order to evaluate the temperature effect (and consequently that of viscosity) on demulsification performance, a series of experiments is conducted with similar emulsions up to different temperature settings, such as 80° C. (T3), 95° C. (T10) and 130° C. (T11). Data of FIG. 5 show that demulsification efficiency (or performance) is proportional to temperature, reaching values higher than 90% at 130° C. It should be pointed out that high temperature operation requires quick and intense application of microwave energy.

According to the invention, the quick and intense application of microwave energy in a short period of time (15 minutes) leads to high microwave desalter efficiencies. This is due to the combined effect of lower viscosity and strong microwaves-emulsion interaction. Results are close to the demulsification efficiency observed in actual desalting plants such as described above, however requiring in those plants rather longer residence times.

Finally, it should be considered that at higher temperatures, besides reducing viscosity, higher levels of applied energy are required, which contributes to improved demulsification performance. Therefore, reduction viscosity as well as increased energy should contribute to demulsification performance.

Such findings are highly relevant during crude oil desalting processes, where the emulsion/dispersion features, when they are known and monitored can constitute an important tool for the improved efficiency of microwave application. The concept of the invention involves improving demulsification yields during the desalting process with the aid of microwave irradiation which can be used in combination with conventional processes in order to treat the emulsion/dispersion or its fractions containing variable water contents. Thus, according to the invention, the control of the features of the emulsion fed to the "microwave desalter" can result in higher efficiency and lower energy costs. Besides, improved droplet contact (coalescence) can be obtained during the demulsification process when the sample is submitted to agitation.

According to the method of the invention, careful characterization of the feed to be treated is carried out in the laboratory, aiming at obtaining a set of optimum initial conditions to be established in the industrial process in refineries or in production units.

The characterization of the feed to be treated includes crude oil feedstock properties (which can usually be evaluated in the laboratory, such as density, viscosity, water content, salinity, resin content, asphaltene content, amount and kind of solids, interfacial film properties, among others) as well as those of the available aqueous streams (which can be salt content, pH value, amount and kind of solids among others).

Laboratory tests aim at evaluating effects of water content in the prepared emulsion, as well as salt content, aqueous phase pH, initial temperature, microwave power level, final temperature and drop size distribution. These data turn into optimum starting conditions for the industrial plant and include water content, salt content, aqueous phase pH value, initial temperature, microwave power level, final temperature and drop size distribution to be adjusted in the industrial plant.

Industrial streams constituting the process feeds are periodically tested in situ or alternatively in the laboratory aiming at the complete characterization of the industrial system as well as the monitoring of the efficiency of the microwave treating method.

Tests on the performance of the microwave separator, in the modes described in the present specification should be conducted on-line or alternatively in the laboratory, seeking separation efficiencies of at least 90%.

Process variables such as flow rates and aqueous streams pH values, oleaginous streams flow rates, temperatures, whirling intensity in mixing devices and microwave power level are monitored and adjusted seeking improved efficiency and better phase separation.

Whenever the method of the invention is applied in production facilities, water addition aiming at salt concentration dilution is not mandatory, such as represented in FIGS. 6, 7 and 8 respectively by numerals (602, (702) and (802), as well as the mixing device (605), (706), (714) and (806) for forming emulsified/dispersed water is dispensed with. Thus, whenever the present process is utilized in production facilities the feed should be considered as being equivalent to streams (606), (707) and (807).

Whenever the present method is to be applied to a refinery, the mixing device, designed in FIGS. 6, 7 and 8 respectively by numerals (605), (706), (714) and (806), is any device able to cause whirling to the feed. A typical useful mixing device is a valve. A further device useful for the purposes of the invention is a static mixer.

FIG. 6 illustrates a schematic process configuration of a first mode of the inventive method, generally represented by numeral (100), where the microwave application and separation of an oleaginous phase and an aqueous phase are carried out in one single device designed by numeral (607). From said device (607) a stream of resistant residual emulsion can be withdrawn, it being designed by numeral (609).

Useful separation devices (or separators) useful for the practice of the invention are three-phase or two-phase separators usually employed in the technique.

In FIG. 6, to feed stream (601) is added aqueous stream (602) having reduced content in water soluble salts and solids in an amount of at least 3% vol/vol, with a typical range between 5 and 10% vol/vol. Alternatively an additional aqueous stream (603') is added or replaces stream (602) aiming at the adjustment of the optimum conditions as regards water and salt content and pH value for the improved performance of the method and minimized water consumption and disposal of fresh water in refineries. Typical water content of resulting stream (604) ranges between 25 and 45% vol/vol, salt content is typically lower than 30,000 mg/L, more usually in refineries the salt content is lower than 1,000 mg/L; stream (604) is directed to an on-line mixing device (605) so as to obtain water-in-oil emulsion/dispersion (606).

Mixing and whirling intensity in said device (605) should be adjusted aiming at the dilution of water soluble salts concentration, improved phase separation efficiency and consequently improved desalting of the feed to be treated. Water-in-oil emulsion/dispersion (606) is directed to device (607) designed for phase separation and which also contains a 1,000 MHz to 300,000 MHz microwave radiation emitter. The application of microwave radiation to emulsified or dispersed water in a pressurized environment which keeps the droplets in an emulsion or dispersion makes possible improved droplet contact and coalescence. The residence time of the emulsion/dispersion in device (607) is between 20 seconds and up to 60 minutes.

In FIG. 6 flowsheet, oleaginous stream (608) and aqueous stream (603) are separated in device (607). Alternatively, from the monitoring of device (607) conditions such as level and water-oil interface composition, a resistant residual, non-resolved emulsion/dispersion (609) can be separated for further treatment.

Stream (608) represents an organic hydrocarbon stream the salt content of which is now reduced, that is, the desired product from the treatment with microwave radiation. Such stream can contain a minor amount of water and entrained solids. When the present method is applied in the production step, stream (608) takes the conventional route of petroleum production. On the other hand, if the present method is used in a refinery, stream (608) is directed for further fractioning.

According to the aspect of monitoring the efficiency of the present method, feed stream (601) is tested relative to viscosity, density, initial water content, total acidity (measured as TAN), asphaltene content and salt content; streams (608) and (609) produced by device (607) are tested for the same variables tested for stream (601), while aqueous streams to be emulsified (602), (603') as well as stream (609) are tested as for pH and salt content assessment.

Alternatively the characterization of oleaginous streams (601), (608) and stream (609) includes measurements of resin content, naphthenic acid content, interfacial viscosity, interfacial tension, amount and kind of solids, while aqueous streams (602), (603') and stream (609) alternatively are complementarily characterized as for amount and kind of solids tests.

Still according to the aspect of monitoring the efficiency of the present method as applied to production facilities as well as to refineries, the water and salt content remaining in product stream (608) are evaluated. According to such remaining content, process conditions such as temperature of streams (601), (602), the flow rates and flow rate ratios of streams (601), (602), (603'), the whirling in mixing device (605), the power of the microwave emitter in device (607) are adjusted aiming at optimum conditions for applying the inventive method.

According to a non-represented modification of the invention mode illustrated in FIG. 6, a new desalting (or demulsification or dehydration) cycle can be considered as possible. When applied to refineries, stream (608) can be added of new aqueous streams equivalent to streams (602) and (603'), with the same or different water amount relative to the feed, the water being originated or not from the same source. This creates a new modulus in series for admixture/dilution of the water soluble salt concentration, microwave radiation application and phase separation.

The process conditions of this new cycle can be the same or different from those practiced in the first cycle, according to the required severity and demanded efficiency.

Still, according to the salt and water contents initially present in feed stream (601), it is possible to consider a third treatment stage, making up an additional (non-represented) variation of the invention mode represented in FIG. 6.

It should be obvious for the experts that although product stream (609) is represented as a lateral withdrawal of device (607), the configuration adopted for said withdrawal is not critical and depends on the specific features of device (607).

Stream (603") represents an aqueous stream effluent from device (607), made up of water and water soluble salts from feed stream (606), but also alternatively it can contain a minor amount of hydrocarbons and entrained solids. Stream (603") is directed to discarding or further treatment using conventional techniques improved or not with the aid of the technique described in the present application.

The flowsheet of FIG. 7, generally represented by numeral (200), is a schematic illustration of a second mode of the inventive method where the microwave radiation is applied before the entry of water-in-oil emulsions in a series of separators, herein indicated as having two stages.

According to the mode illustrated in FIG. 7, the microwave radiation emitters are contained in a device designated by numerals (708) and (716), while the phase separation devices are designed by numerals (710) and (718), those including centrifugation, gravity separation, ultrasound, hydrocyclones, electrostatic separation, filtration, membrane separation or a combination of these techniques.

According to the mode illustrated in FIG. 7, to oil feed stream (701) is added aqueous stream (702) having reduced content in water soluble salts and solids. Alternatively streams (703') and/or (704') can be added, those streams being originated from separators (710) and (718), in addition to or in replacement of stream (702), aiming at the adjustment of optimum conditions of water and salt content and pH for the improved performance of the process, forming stream (705) at a concentration of at least 10% vol/vol based on oil, a typical range being between 25% and 45% vol/vol based on oil, salt contents typically lower than 30,000 mg/L, more usually in refineries lower than 1,000 mg/L, said stream being directed to an on-line mixing device (706), forming water-in-oil emulsion/dispersion (707). Such stream (707) is directed to device (708) containing a 1,000 MHz to 300,000 MHz microwave radiation emitter for applying microwave radiation to emulsified or dispersed water. Residence time within device (708) is between 10 seconds and up to 60 minutes. Thereafter stream (709) is directed to a separation device (710) the separation being carried out with the aid of centrifugation, gravity separation, ultrasound, hydrocyclones, electrostatic separation, filtration, membrane separation or a combination of these techniques.

Device (710) separates feed stream (709) into two streams, one of them (711) containing predominantly oil and another one (704) containing predominantly water from stream (709). Stream (704) can be split and a portion of it, forming aqueous stream (704') can be utilized to be dispersed in oil stream (701) or otherwise directed to further treatment, stream (704").

Under the point of view of the monitoring of the method efficiency, stream (701) containing the feed of the unit should be characterized in terms of viscosity, density, initial water content, total acidity (measured as TAN—Total Acidity Number), asphaltene and salt content. Streams (711) and (719), respectively products of the first and second stages and containing predominantly oil should be tested as for the same variables characterized in stream (701), while aqueous streams (702), (703'), (704'), (712) and (703") to be emulsified should be characterized in terms of pH and salt content values.

Stream (701) containing the feed of the unit can have its characterization complemented by tests related to resin content, naphthenic acid content, interfacial viscosity, interfacial tension, amount and kind of solids. Streams (711) and (719) respectively products of the first and second stages containing predominantly oil should be tested as for the same variables tested for stream (701), while aqueous streams (702), (703'), (704'), (712) and (703") to be emulsified can have their characterization complemented by the tests of amount and kind of solids.

Still according to the aspect of the monitoring of the efficiency of the present method, to be applied in production facilities as well as in refineries, the water and salt contents remaining in product stream (711) are evaluated. According to the remaining contents of these parameters, process conditions described for the first mode of the invention are adjusted aiming at optimum conditions for applying the method of the invention.

Thus, according to the water and salt contents remaining in product stream (711) found in the analytical test, process conditions such as temperature of streams (701), (702), flow rates and ratio of flow rates of streams (701), (702), (703'), (704'), the whirling in mixing device (706), and the power of the microwave emitter in device (708) are adjusted aiming at optimum application conditions.

Alternatively, one can consider the possibility of a new modulus in series for the admixture/dilution of water soluble salts, application of microwave radiation and phase separation, under equivalent or distinct process conditions, such as presented above in the present specification for the second mode of the invention.

Oil-containing stream (711) that has been treated in the first stage is again emulsified for the second stage treatment. To oil feed stream (711) is added fresh water stream (712), said stream being originated or not from the same stream than the first stage aqueous stream (702). Alternatively to stream (711) can be added aqueous stream (703") recycled from device (718) forming stream (713) the concentration of which is at least 10% vol/vol based on oil, with a typical range between 25 and 45% vol/vol based on oil, the salt content of which depends on the efficiency of the first stage process, said stream being directed to an on-line mixing device (714), forming the water in oil emulsion/dispersion (715). Said stream (715) is directed to device (716) containing a 1,000 MHz to 300,000 MHz microwave radiation emitter for applying microwave radiation in emulsified or dispersed water. The residence time in device (716) is between 10 seconds and up to 60 minutes. Thereafter steam (717) is directed to device (718) for phase separation.

Device (718) separates feed stream (717) into water and oil, with stream (719) containing predominantly oil at a concentration of up to 99.9% vol/vol oil, where: if the process is applied to the production step, stream (719) is directed to the conventional petroleum production route, while if the process is utilized in a refinery, stream (719) is conveyed for further processing. Predominantly aqueous stream (703) can be split into streams (703') and (703"), directed to be admixed respectively to oil streams (701) and (711).

In order to optimize the microwave apparatus utilization according to the aspect of monitoring the efficiency of the present method, the quality of oil and of water should be continuously assessed through laboratory or on-line measurements. The main streams to be assessed in the context of this mode are: stream (701) containing the unit feed, such stream being tested as for initial water content, acidity, resin content, asphaltene content, amount and kind of solids and salt content; streams (711) and (719) products respectively of the first and second stages containing predominantly oil and that should be characterized in terms of the same variables tested for stream (701). Aqueous streams to be emulsified, (702), (703'), (704'), (712) and (703") should be characterized in terms of pH, salt content and solids content measurements.

Still under the point of view of monitoring the efficiency of the inventive method, tests of water content and remaining salts in product stream (719) aim at monitoring the method and adjusting optimum application conditions.

Thus, aiming at optimum application conditions, following determined water and salts content remaining in product stream (719), process conditions such as stream (712) temperature, flow rates and flow rate ratios of streams (713), (712), (703 "), whirling in admixing device (714), as well as microwave emitter power in device (716) are adjusted.

The formation of emulsions which withstand separation within separators such as electrostatic separators for example is a huge process drawback. Such non-resolved emulsions can occupy a significant volume of the vessel, reducing residence time in the separator and jeopardizing process efficiency.

In the scope of the present invention, one solution for this problem is to monitor the conditions of the phase separation devices, such as level and composition of the water-oil interface for promoting the withdrawal of this layer of persisting residual emulsion/dispersion from within the separator and further microwave treatment of such emulsion in a different device to make possible its separation into an oleaginous phase and an aqueous phase.

The flowsheet of FIG. 8, generally designed by numeral (300), schematically illustrates such process configuration.

The flowsheet of FIG. 8 schematically depicts a third mode of the inventive method where the microwave radiation is applied to device (808) before the water-in-oil emulsion enters into phase separation device (810) and, additionally, the radiation is applied in device (815) to stream (812) containing persistent emulsion withdrawn from device (810).

In the configuration depicted in said FIG. 8, to oil feed stream (801) is added aqueous stream (802) having reduced content in water soluble salts and solids. Alternatively, to said stream (801) can be added aqueous streams (803) and/or (804') and/or (816') originating from another separation stage, from device (810) and from microwave device (814) respectively. Such aqueous streams can be present together or not, replacing stream (802) or not, aiming the adjustment of the optimum conditions related to water and salt content and pH value for improved process performance, forming stream (805) in a concentration of at least 10% vol/vol based on oil, a typical range being between 25 and 45% vol/vol based on oil and salt contents typically lower than 30,000 mg/L, more usually in refineries lower than 1,000 mg/L, such stream (805) being directed to an on-line mixing device (806). Such mixing device (806) will cause whirling in said stream (805) forming water-in-oil emulsion/dispersion (807) directed to device (808) containing a 1,000 MHz to 300,000 MHz microwave radiation emitter for applying microwave radiation to emulsified or dispersed water. The residence time in device (808) is between 10 seconds and up to 60 minutes. Thereafter stream (809) is directed to separation device (810). Alternatively, the whole or a portion of stream (807), as stream (807') bypasses device (808) and is added to stream (809).

In device (810) separation is carried out using centrifugation, gravity, ultrasound, hydrocyclones, electrostatics, filtration, membrane or a combination of these techniques.

Device (810) separates feed stream (809) into three streams, one, (811), containing predominantly oil, another one, (804), containing predominantly water, originated from stream (809) and a stream (812) made up of a persistent emulsion/dispersion.

When the method is applied both to production facilities or to refineries, tests are carried out on water and salt contents remaining in product stream (811).

Based on said remaining contents, process conditions such as those described in the first mode can be adjusted aiming at optimum conditions for applying the method of the invention, according to the aspect of the monitoring of the efficiency of the inventive method.

Alternatively, one can consider the possibility of directing product stream (811) to a second modulus in series for the admixture/dilution of the water soluble salts concentration, application of microwave radiation and phase separation, under the same or different process conditions, such as set forth in the second mode of the invention described above in the present specification.

Still alternatively, it is possible to direct stream (811) for further fractioning in case of application to refineries or when applied to production step, to follow the conventional route of petroleum production.

Stream (804) can be split, forming stream (804') to be used in the process aiming at being emulsified in oil stream (801) and generating stream (804") to be sent for further treatment.

The persistent emulsion formed within device (810) can be either totally or partially withdrawn from said device (810) with the aid of a collector or any other similar device, such as a third stream (812) separated in said device (810). To said stream (812) can be added aqueous stream (813) equivalent to stream (802) originating or not from the same source than aqueous stream (802), aiming at the adjustment of the optimum water, salt content and pH value for the improved performance of the process, forming stream (814). Said stream (814) is directed to device (815) where it is irradiated with the aid of a 1,000 MHz to 300,000 MHz microwave radiation emitter for the application of microwave radiation at a residence time from 10 seconds to 60 minutes.

Device (815) is provided with two outlet streams (817) and (816), respectively oleaginous and aqueous, the composition of which depends on the nature of the persistent emulsion formed and on treatment conditions in device (815).

Separated aqueous stream (816) can be split and directed for recycling, being added upwards device (815) itself as stream (816''') and/or be added to feed stream (801) as stream (816'), making up a recycle for device (810) for phase separation and/or be directed as stream (816") for further treatment.

Depending on the water and salt content of oleaginous stream (817) it can be directed to fractioning or to another desalting (or demulsification or dehydration) stage or still as recycle for some of the separation stages of this mode.

In the scope of the mode of the invention depicted in FIG. 8, and under the monitoring aspect set forth in the present method, oil streams (801), (811), (817) are characterized in terms of viscosity, density, initial water content, total acidity (measured as TAN), asphaltene content and salt content. Streams (811) and (817) products of device (810) and device (815) respectively containing predominantly oil are characterized in terms of the same variables tested for stream (801), while aqueous streams to be emulsified (802), (803), (804'), (816'), (816'''), (813) are tested as for pH value and salt content assessment.

Alternatively the characterization of oleaginous streams (801), (811), (817) is complemented by tests of resin content, naphthenic acid content, interfacial viscosity, interfacial tension, amount and kind of solids, while the characterization of aqueous streams (802), (803), (804'), (816'), (816''') and (813) is complemented by characterizations of amount and kind of solids.

Still under the monitoring aspect, remaining water and salt content characterizations are carried out on product streams (811) and (817) aiming at the monitoring of the method efficiency and the adjustment of the optimum application conditions.

Thus, according to the remaining water and salt contents in product streams (811) and (817) determined in the tests, process conditions such as the temperature of streams (801), (802) and (813), flow rates and flow rate ratios of streams (802), (803), (807'), (804'), (816'), (813) and (816'''), whirling in mixing device (806), power of microwave emitter in devices (808) and (815) are adjusted aiming at optimum application conditions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for the microwave treatment of water-in-oil emulsions/dispersions (W/O), wherein said method comprises the steps of:
   a) determining in the laboratory, for a W/O emulsion/dispersion prepared from a crude oil stream 601, 701, 711, 801 and aqueous streams 602, 603', 702, 703', 704', 712", 703", 802, 803, 804', 816', 813 and 816" the optimum conditions of the variables: water content, salt content, pH of aqueous phase, initial temperature, microwave power, final temperature and drop size distribution to be adjusted in the industrial plant, such conditions being a function of the features of said crude oil stream to be characterized including viscosity, density, asphaltene content, total acidity (as TAN), such conditions being those to obtain at least 90% separation efficiency for said W/O emulsion/dispersion in the presence of microwave radiation;
   b) utilizing such information for the initial adjustment of application conditions of the method in phase separation units 100, 200, 300 in refineries and production units;
   c) running on line and laboratory tests of the variables of step a) and of the process response in the effluent streams from said phase separation units, this response being the water content and salt content measurements, so as to feedback the information to the best adjustment of the process conditions for microwave application; and
   d) utilizing additionally said on line tests on the effect of the method as a tool for monitoring the efficiency of the treatment for the breaking of said W/O emulsion/dispersion.

2. A method according to claim 1, wherein said W/O emulsion/dispersion further comprises i) crude oil distillates, crude oil residues, or mixtures thereof; ii) oils from vegetable or animal sources; iii) synthetic oils, selected from silicone oils net or in admixture of any amount; and iv) solids, asphaltenes, organic acids, basic nitrogen compounds, or mixtures thereof.

3. A method according to claim 2, wherein said W/O emulsion/dispersion -further includes emulsifiers originally present in the oils and added demulsifying surface active agents.

4. A method according to claim 1, wherein the characterization of crude oil stream 601, 701, 711, 801 includes measurements of resin content, naphthenic acid content, interfacial viscosity, interfacial tension, and amount and type of solids.

5. A method according to claim 1, wherein an oil stream 601 added of aqueous stream 602 forms a stream 604 having a water content of at least 10% vol/vol based on the oil, and salt contents lower than 30,000 mg/L in production units and 1,000 mg/L in refineries, such stream 604 being directed to an on line mixing device 605 forming a water-in-oil emulsion/dispersion 606 to be submitted to
turbulency in said mixing device 605, obtaining an emulsion/dispersion stream 606, said stream being directed to a device 607 containing a microwave emitter emitting radiation in the frequency between 1,000 MHz to 300,000 MHz, where: a) said stream 606 is submitted to the action of said microwave emitter during 20 seconds to 60 minutes, and thereafter an oil product stream 608 is separated of reduced salt content and an aqueous stream 603; b) from said device 607 is separated a resistant emulsion stream 609 sent for further treatment.

6. A method according to claim 5, wherein following measurement on water and salt remaining content carried out on product stream 608 process conditions comprising temperature of streams 601, 602, flow rates and ratio of flow rates of streams 601, 602, 603', turbulency in mixing device 605, and microwave power in device 607 are adjusted aiming at optimum application conditions.

7. A method according to claim 5, wherein a portion of aqueous stream 603, stream 603', is combined to streams 601 and 602, while stream 603" is directed for discarding or for further treatment.

8. A method according to claim 5, wherein alternatively stream 608 is submitted to a second desalting, demulsification or dehydration stage, under the same or different process conditions from the said first cycle, being added of additional aqueous streams equivalent to streams 602 and 603' having the same or different water percentage based on the feed, said water being originated or not from the same source, so as to create in series a new module of mixing/dilution of the water soluble salt concentration, microwave radiation application and phase separation.

9. A method according to claim 5, wherein: i) oil feed stream 601 and streams 608 and 609 produced by device 607 are characterized as for viscosity, density, initial water content, total acidity (as TAN), asphaltene content and salt content, resin and naphthenic acid content, interfacial viscosity, interfacial tension, and amount and type of solids; and ii) aqueous streams 602, 603' to be emulsified and stream 609 are characterized as for the assessment of pH and salt content as well as amount and type of solids.

10. A method according to claim 1, wherein in a first stage, to an oil feed stream 701 is added an aqueous stream 702, forming a stream 705 of at least 10% vol/vol concentration based on the oil, and salt contents lower than 30,000 mg/L in production units and 1,000 mg/L in refineries, such stream being directed to an on line mixing device 706, forming a water-in-oil
emulsion/dispersion 707, said stream 707 being directed to a device 708 containing a 1,000 MHz to 300,000 MHz microwave emitter for the application of microwave radiation in emulsified or dispersed water, emulsion/dispersion 707 having a residence time in device 708 between 10 seconds up to 60 minutes, after which stream 709 is directed to a separation device 710 where it is split into two streams, one of them containing predominantly oil 711 and the other stream 704 containing predominantly water from stream 709.

11. A method according to claim 10, wherein following measurement on water and salt content remaining in product stream 711 process conditions comprising temperature of streams 701, 702, flow rates and ratio of flow rates of streams 701, 702, 703', 704', the turbulency in mixing device 706, microwave power in device 708 are adjusted aiming at optimum application conditions.

12. A method according to claim 10, wherein, aiming at the adjustment of the optimum conditions for water and salt content and pH value for the improved performance of the process stream 701 receives streams 703' and/or 704' originating from separation devices 710 and 718, which are added to or replace stream 702, or alternatively stream 704 is split and a portion of it forming aqueous stream 704' is utilized for dispersion into oil feed stream 701 or directed for further treatment as stream 704".

13. A method according to claim 10, wherein additionally in a second stage, to oil feed stream 711 produced in the first stream is added either recycled water stream 703' or fresh water stream 712 originating or not from the same source than first stage aqueous stream 702, forming stream 713 having at least 10% vol/vol concentration based on oil, the salt content of which being a
function of the efficiency of the first stage treatment, said stream being directed to an on line mixing device 714, forming a water-in-oil emulsion/dispersion 715, said stream 715 being directed to a device 716 containing a 1,000 MHz to 300,000 MHz microwave radiation emitter for the application of microwave radiation to emulsified or dispersed water, the residence time of emulsion 715 in device 716 being from 10 seconds and up to 60 minutes, after which stream 717 is directed to a device 718 for phase separation.

14. A method according to claim 13, wherein device 718 separates feed stream 717 into water and oil, with stream 719 containing predominantly oil at a concentration of up to 99.9% v/v oil, where when the process is applied to the production step, stream 719 follows the conventional route of petroleum production while if the process is applied to a refinery, stream 719 is directed for further fractioning while the predominantly aqueous stream 703 is split into streams 703' and 703" directed for mixing into the oil in streams 701 and 711, respectively.

15. A method according to claim 13, wherein in order to monitor the efficiency of the said method and to adjust the optimum application conditions, product stream 719 is characterized as for the remaining water and salt content, whereby according to the water and salt content remaining in said product stream 719 found in said characterization,
process conditions comprising stream 712 temperature, flow rates and ratio of flow rates of streams 713, 712, 703", turbulency in mixing device 714 and microwave emitter power in device 716 are adjusted aiming at optimum application conditions.

16. A method according to claim 10, wherein in order to optimize the utilization of the microwave equipment, stream 701 containing the unit feed and streams 711 and 719 products respectively of the first and second stages containing predominantly oil should be characterized as for viscosity, density, initial water content, total acidity (as TAN), asphaltene content and salt content, resin and naphthenic acid content, interfacial viscosity, interfacial tension, and amount and type of solids.

17. A method according to claim 13, wherein aqueous streams 702, 703', 704', 712 and 703" to be emulsified should be characterized as for pH and salt content assessment and complementarily characterized by tests of amount and type of solids.

18. A method according to claim 10, wherein separation devices 710 and 718 individually operate through centrifugation, gravity, ultra-sound, hydrocyclones, electrostatic separation, filtration, membrane separation or a combination thereof.

19. A method according to claim 1, wherein to an oil feed stream 801 is added an aqueous stream 802 having a reduced content in water soluble salts and solids, forming a stream 805 at a concentration of at least 10% vol/vol based on the oil, and salt contents lower than 30,000 mg/L in production units and 1,000 mg/L in refineries, said stream (805) being directed to an on line mixing device 806, said device causing turbulency in stream 805 forming water-in-oil emulsion/dispersion 807, said stream being directed to device 808 containing a 1,000 MHz to 300,000 MHz microwave radiation emitter, for microwave radiation application to emulsified or dispersed water, the residence time in device 808 being between 10 seconds and up to 60 minutes and afterwards stream 809 is directed to a separation device 810 where the feed stream 809 is separated into three streams, one containing predominantly oil, stream 811, another stream 804 containing predominantly water, stream 804 being split so as to originate stream 804' to be utilized in the process aiming at being emulsified in oil stream 801 while generating stream 804' to be sent for further treatment; and a stream 812 made up of a persistent emulsion/dispersion.

20. A method according to claim 19, wherein: i) aiming at the adjustment of the optimum conditions of water content, salt and pH alternatively to oil stream 801 are added aqueous streams 803 and/or 804' and/or 816' said aqueous streams being present together or not, replacing stream 802 or not; and ii) either when applied to production facilities or to refineries, the remaining water and salt content in product stream 811 are characterized aiming at the adjustment of the optimum conditions for the application of said method; iii) alternatively, the whole or a portion of stream 807, as stream 807' bypasses device 808 to be added to stream 809.

21. A method according to claim 19, wherein alternatively from product stream 811 a new mixing/dilution module follows in series or still stream 811 follows further fractioning in case said method is applied to a refinery while when it is applied to the production step, the conventional production petroleum route is followed.

22. A method according to claim 19, wherein separation in device 810 is performed with the aid of centrifugation, gravity, ultrasound hydrocyclones, electrostatic separation, filtration, membrane separation or a combination of these techniques.

23. A method according to claim 19, wherein to persistent emulsion stream 812 is added aqueous stream 813—equivalent to stream 802—said stream 813 being originated or not from the same source than aqueous stream 802, said addition aiming at the adjustment of the optimum conditions of water and salt content as well as pH value for the improved performance of the said method, forming stream 814 sent to device 815 where said stream 814 is irradiated and separated into: i) oil stream 817, which after measurement of water and salt content is sent for fractioning or for another desalting (or demulsification or dehydrating) stage or as a recycle for some of the separation stages as a function of the water and salt content of said stream; and ii) aqueous stream 816, the composition of which depends on the nature of the persistent emulsion formed and on the treatment conditions in device 815, stream 816 being split and sent to recycle being added upstream of device 815 itself as stream 816''' and/or to be added to oil stream 801 as stream 816', making up a recycle for device 810 for phase separation and/or be sent as stream 816" for further treatment.

24. A method according to claim 19, wherein: i) oil stream 801, containing the unit feed and streams 811 and 817 products from device 810 and 815 respectively containing predominantly oil are characterized as for viscosity, density, initial water content, total acidity (as TAN), asphaltene and salt content, resin and naphthenic acid content, interfacial viscosity, and amount and type of solids; and ii) aqueous streams to be emulsified 802, 803, 804', 816', 816''', 813 are characterized as for pH and salt content as well as for amount and type of solids.

25. A method according to claim 24, wherein following characterization of remaining water and salt content performed on product streams 811 and 817, process conditions comprising temperature of streams 801, 802 and 813, flow rates and ratio of flow rates of streams 802, 803, 807', 804', 816', 813 and 816''' turbulency in mixing device 806 and microwave emitter power in devices 808 and 815 are adjusted aiming at the optimum application conditions.

\* \* \* \* \*